United States Patent [19]

Hall, Jr.

[11] 4,163,206
[45] Jul. 31, 1979

[54] APPARATUS AND METHOD FOR SEISMIC WAVE DETECTION

[75] Inventor: Ernest M. Hall, Jr., Houston, Tex.

[73] Assignee: Western Geophysical Co. of America, Houston, Tex.

[21] Appl. No.: 848,704

[22] Filed: Nov. 4, 1977

Related U.S. Application Data

[63] Continuation-in-part of Ser. No. 704,149, Jul. 12, 1976, abandoned, and Ser. No. 679,416, Apr. 22, 1976, abandoned.

[51] Int. Cl.$^2$ .................. G01V 1/16; H04R 15/00; H04R 17/00
[52] U.S. Cl. .................. 340/17 R; 340/7 R; 340/8 R; 340/10
[58] Field of Search ............. 340/7 R, 8 S, 8 LF, 340/8 R, 9, 10, 17 R; 181/101, 125; 310/329

[56] References Cited

U.S. PATENT DOCUMENTS

| | | | |
|---|---|---|---|
| 2,740,945 | 4/1956 | Howes | 340/15.5 R |
| 2,846,662 | 8/1958 | Sparks | 340/15.5 GC |
| 3,158,831 | 11/1964 | Boyer | 310/329 |
| 3,241,373 | 3/1966 | Ricketts et al. | 310/329 |
| 3,281,768 | 10/1966 | Pavey, Jr. et al. | 340/7 R |
| 3,311,873 | 3/1967 | Schloss | 340/10 |
| 3,320,580 | 5/1967 | Sykes | 340/10 |
| 3,320,582 | 5/1967 | Sykes | 340/10 |
| 3,332,057 | 7/1967 | Pavey, Jr. | 340/7 R |
| 3,629,801 | 12/1971 | Brede | 340/15.5 MC |
| 3,921,755 | 11/1975 | Thigpen | 181/122 |
| 3,932,834 | 1/1976 | Sutherland | 340/7 R |

Primary Examiner—Maynard R. Wilbur
Assistant Examiner—Lawrence Goodwin
Attorney, Agent, or Firm—William A. Knox

[57] ABSTRACT

Seismic waves are detected for a given seismic prospect with an accelerometer and a hydrophone and the outputs of said accelerometer and hydrophone are combined directly to create a signal for seismic analysis. The accelerometer and hydrophone may be combined physically in a single composite unit for recording the seismic waves or an accelerometer and hydrophone may record the seismic survey independently for subsequent combining of the signals from the accelerometer and hydrophone.

3 Claims, 15 Drawing Figures

APPARATUS AND METHOD FOR SEISMIC WAVE DETECTION

RELATED APPLICATIONS

This is a continuation-in-part application of copending applications Ser. No. 704,149, filed July 12, 1976 entitled "Composite Accelerometer and Hydrophone Detector" and Ser. No. 679,416, filed Apr. 22, 1976 entitled "Receiving Seismic Waves With An Accelerometer And A Hydrophone," both now abandoned.

BACKGROUND OF THE INVENTION

1. Field of the Invention

This invention relates to seismic prospecting, and more particularly, to a new method and apparatus for detecting seismic signals and generating signals for subsequent seismic analysis.

2. Prior Art

In seismic prospecting, seismic waves are generated in an elastic medium such as land or water, and the reflected seismic waves are detected with sensors such as hydrophones, geophones and accelerometers. A geophone is a velocity sensitive detector which must be well coupled to the earth in order to sense meaningful seismic information. Geophones are used primarily on land because of this coupling requirement. A hydrophone is a pressure sensitive detector which must be fully submersed in water or liquid in order to work properly. Hydrophones used in commercial marine seismic surveys are designed to be insensitive to acceleration forces. To increase sensitivity to pressure signals, pairs of piezo-electric ceramic wafers are secured to pliable diaphragms. Pressure variations flex the wafers which generate a signal proportional to the pressure variations. The wafers are also subject to acceleration forces but, because the mass of the wafers is very small, the acceleration component of the total output signal is comparable to the ambient noise, and is inseparable therefrom. Since the acceleration signals cannot be separated from the noise signals, their combination tends to increase the noise contamination of the desired pressure signal. For this reason, the outputs of the individual wafers of the pair are electrically connected so as to cancel the acceleration signal and to reinforce pressure signals. Accelerometers sense particle acceleration and are also used primarily on land in order to sense pertinent seismic data. Historically, seismic surveying was performed primarily on land using geophones and/or accelerometers. Later, seismic prospecting moved offshore using hydrophones. However, areas such as swamps, marshes, rivers, bays and the like must also be surveyed in which the use of only one type of such seismic sensors does not always yield meaningful information. In such transitional areas, it is impractical to attempt to use more than one type of sensor in a particular survey in order to use, for example, hydrophones in water and geophones on land because the actual limits of land and water are not always easily defined beforehand.

Prior devices, such as shown in U.S. Pat. No. 3,921,755, have used both hydrophones and geophones connected to the same cable. Their output signals are simultaneously but separately recorded for later processing and comparison. A similar system is disclosed in U.S. Pat. No. 3,629,801. In other prior devices, hydrophones and geophones or accelerometers have been combined within a single housing to provide one type of seismic sensor package for these purposes.

Hydrophones have been combined with geophones as shown in U.S. Pat. Nos. 2,740,945; 2,846,662; and 3,332,057, in order to provide directional sensitivity: That is, to discriminate between desired upwardly-directed reflections from subterranean earth layers, and downwardly traveling surface waves or direct arrivals. Such devices are not satisfactory for use in transition areas because the output signals from velocity sensors (geophones) and hydrophones (pressure sensors) are 90° out of phase with each other and therefore they cannot be combined meaningfully without special processing.

Hydrophones have been combined with accelerometers in U.S. Pat. Nos. 3,158,831; 3,281,763 and 3,311,873. In the first two patents and, by reference in the third patent, the accelerometer output signals are integrated in order to produce a signal proportional to particle velocity. These devices are not suitable for use in transition zones for the reasons discussed above.

U.S. Pat. Nos. 3,320,580 and 3,320,582 disclose a combination sensor wherein a single pair of piezo-electric crystal elements is employed to determine particle displacement, velocity, acceleration, pressure and pressure gradient. The basic output signal is proportional to the combined forces due to pressure and acceleration. Acceleration signals are separated from pressure signals by addition and subtraction circuitry. The remaining parameters listed above are derived by additional signal processing. The device is basically an acceleration-sensitive hydrophone. In the seismic exploration industry, as discussed previously, commercially available hydrophones are constructed so as to be insensitive to acceleration forces to prevent the acceleration signals from combining with ambient noise and further contaminating the pressure signals. Accordingly the acceleration-sensitive device disclosed in the above two patents is unsuited for marine or transition-zone use.

Throughout this application, where required, the seismic industry standard convention with respect to seismic sensor polarities will be used. The positive terminal of the device is considered to be the one which is negative with respect to the other terminal for a pressure increase or an upwardly-directed motion or acceleration of the earth.

Applicant has discovered that the theoretical assumptions taught by the prior art are in error and that the output signals of pressure sensitive and acceleration sensitive sensors may be combined directly to produce a meaningful signal for seismic analysis.

SUMMARY OF THE INVENTION

By using Applicant's invention, a seismic survey may be conducted first with pressure sensitive detectors, and coincidently or subsequently with acceleration sensitive detectors. These two detectors produce signals which may be combined for seismic analysis. Alternatively, a composite sensor containing both pressure and acceleration sensitive detectors having their outputs combined may be used to produce the combined signal. In a preferred embodiment, the output of an acceleration insensitive pressure detector is combined with the output of an orientation sensitive acceleration detector without integration, filtering, phase adjustment, wave shaping or other signal alteration. When separate surveys are taken with pressure sensitive and acceleration sensitive sensors, the surveys may be taken at exactly the same location or in adjacent areas before the outputs of the sensors are combined.

It is therefore an object of the invention to provide a method for performing a seismic prospect by combining the signals from pressure sensitive and acceleration sensitive detectors.

It is a further object of the invention to provide a method for performing a seismic survey in areas such as rivers, marshes, bays and the like.

It is still a further object of the invention to provide a composite seismic sensor which contains both pressure sensitive and acceleration sensitive detectors wherein the outputs of said detectors are combined to form a composite signal.

BRIEF DESCRIPTION OF THE DRAWINGS

The foregoing and other objects, features, and advantages of the invention will be apparent from the following more particular description of embodiments of the invention as illustrated in the accompanying drawings in which.

DETAILED DESCRIPTION OF A PREFERRED EMBODIMENT

Figure 6:
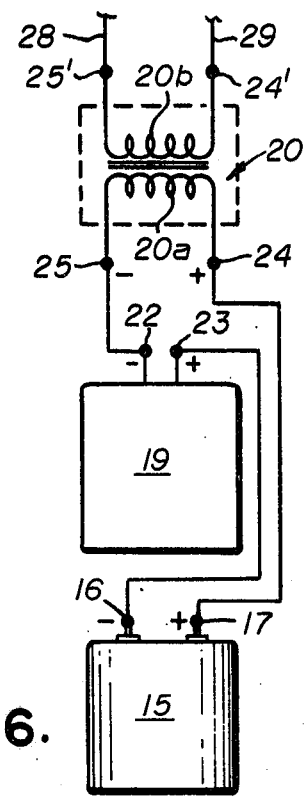
FIG. 6 is a schematic of the wiring diagram of the composite detector.
Figure 3:
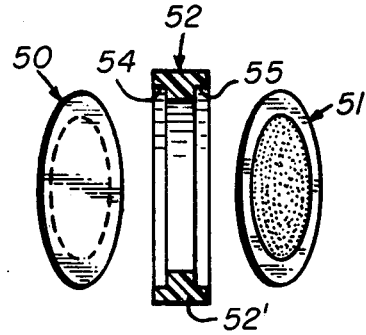
FIG. 3 is an exploded elevational view, partly in section, of the crystal assembly used in the hydrophone.
Figure 4:
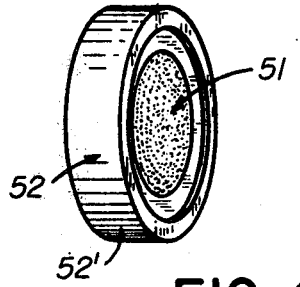
FIG. 4 is a view in elevation of the crystal assembly.
Figure 5:
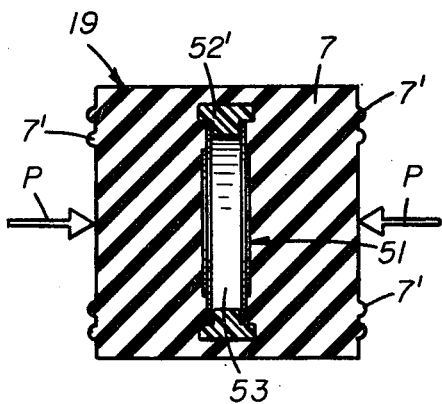
FIG. 5 is a sectional view of the hydrophone.

Referring now to FIGS. 1-5, there is shown a composite detector unit, generally designated as 10, having an elongated, hollow, rigid tubular housing or casing 11 with one or more angularly spaced perforations or "pressure windows" 12 through the cylindrical wall thereof. The perforations lie in a substantially horizontal plane. The lower end of casing 11 is preferably provided with a threaded conical end cap 13 to facilitate the penetration of casing 11 into mud, or the like. In the casing's bore 14 are snuggly fitted and stacked an accelerometer 15 having a pair of output terminals 16, 17. Above the accelerometer 15 is positioned a hydrophone 19 having output terminals 22, 23 (FIG. 6). If desired, in the upper end of bore 14 is positioned a transformer 20 having a primary winding 20a, a secondary winding 20b, a pair of input terminals 24, 25 to the primary winding, and a pair of output terminals 24', 25' from the secondary winding. Terminals 24', 25' are connected to a pair of wires 28, 29 of a takeout cable 30 gripped by a chuck 31 on the upper-most end of casing 11. To anchor the wires 28, 29 to the casing, there is provided an anchor 21, as disclosed in U.S. Pat. No. 3,931,453. A seal 21' provides an upper seal for bore 14.

Hydrophone 19 is positioned between two annular rigid discs 61, 62, having center holes 61', 62', respectively, through which extend the wires interconnecting the hydrophone with the accelerometer.

The preferred embodiment of the accelerometer 15 (FIG. 2) is more fully described in copending patent application Ser. No. 870,618 which is incorporated herein by reference (other examples of accelerometers are shown in U.S. Pat. Nos. 3,374,663, 3,586,889 and 3,360,772). It comprises a cylindrical housing 40 having bottom and top covers 41 and 42 which hermetically seal its inner cylindrical cavity 43. An annular ring 44 rests on the bottom cover 41 and provides a support for a circular conductive substrate 45a to the underbottom of which is secured bender crystal 45 having a bottom silver electrode 45b. From the electrodes 45a, 45b extend a pair of wires 45'a and 45'b, respectively, which are connected to the output terminals 16 and 17 of the accelerometer.

Inside a cylindrical guide sleeve 48 is loosely positioned a heavy cylindrical inertia mass, generally designated as 36. Mass 36 has a body 49, having a top end 39a and a bottom end 39b from the center of which downwardly extends a small cylindrical hammer 47 which is gravitationally coupled to and therefore resting on the upper electrode 45a when the accelerometer is upright. The mass 36 is free to move up and down, between substrate 45a and on upper limit stop 42, in a completely unrestrained manner inside sleeve 48. In one embodiment of the invention the inner diameter of sleeve 48 was 1.035" and the diameter of body 49 was 1.0". Since sleeve 48 is typically made of plastic and mass 36 is made of steel, to protect sleeve 48 against abrasion there are provided a pair of axially-spaced O-rings 38a and 38b which serve as lateral bumpers. The downward movement of crystal 45 is limited by a stop 41a upwardly-extending from bottom cover 41.

Figure 1:
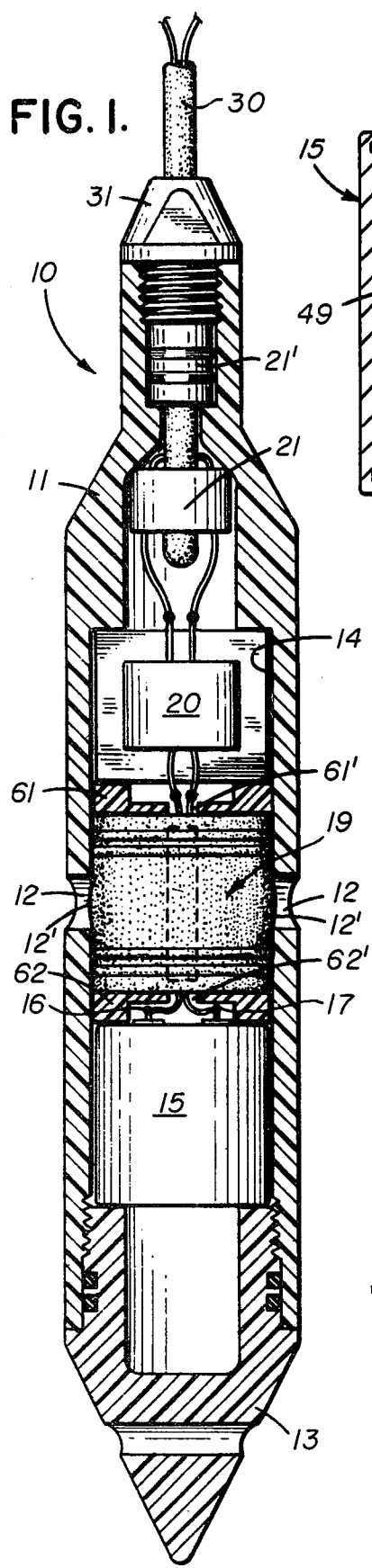
FIG. 1 is an elevational view, partly in section, of the composite detector embodying the invention.
Figure 2:
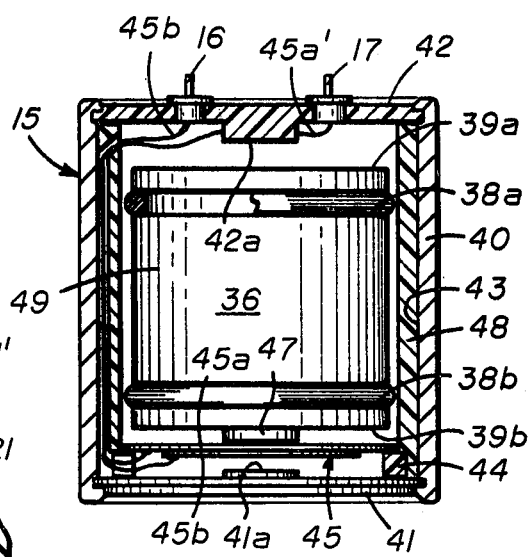
FIG. 2 is a view in elevation, partly in section, of the accelerometer used in the composite detector.

Thus mass 36 is coupled to crystal 45 only by the downward pull exerted by the gravitational field applied to the center of gravity of mass 36. The full weight of mass 36 exerts a pressure on the crystal 45 only when the accelerometer is upright, as shown in FIG. 2. Hence the sensitivity of the accelerometer will vary as a function of the cosine of the angle A (FIG. 7) between the longitudinal axis LA of the accelerometer and the vertical V for different inclinations of the accelerometer. When the accelerometer is on its side (A=90°), the vertical component of the gravitational pull along axis LA is zero, and therefore no pressure is exerted on the crystal 45 by the weight of mass 36.

A chart of accelerometer sensitivity vs. angle of tilt A is shown below:

| ANGLE | SENSITIVITY |
|---|---|
| 0° | 1.0 |
| 10° | .98 |
| 20° | .94 |
| 30° | .87 |

| -continued | |
|---|---|
| ANGLE | SENSITIVITY |
| 40° | .77 |
| 50° | .64 |
| 60° | .50 |
| 70° | .34 |
| 80° | .17 |
| 90° | 0 |

Hydrophone 19 has a core 7 made from a pressure-transmitting, elastomer material such as soft plastic or rubber, as more fully described in copending patent application Ser. No. 704,148, filed July 12, 1976, now U.S. Pat. No. 4,092,628, the description of which is incorporated herein by reference. For additional sealing protection of bore 14, body 17 is provided with top and bottom O-rings 7'.

The hydrophone 19 has an elastomer core 7 in which is embedded a pressure transducer element 52. The elastomer core 7 is preferably symmetrically positioned relative to a transverse plane passing through windows 12.

Hydrophone 19 is made by totally encapsulating the pressure transducer element 52 in the elastomer core 7 which serves as a pressure-transmitting support for the transducer element 52 and as a plug 12' to seal windows 12 against moisture penetration into bore 14.

The mold which receives the encapsulating elastomer is provided with top and bottom circular grooves such that the encapsulant forms O-rings 7' which improves the sealing function of the core.

The transducer element 52 comprises a spacer ring 52' having two counter bores 54, 55 adapted to receive circular crystals 50, 51, respectively. The separation 53 between the circular discs is on the order of 0.050 and 0.150 mils so as to allow the discs to flex in response to impinging pressure waves P. The crystals are electrically connected in parallel.

It is desired for the core 7 to become slightly compressed in order to improve the coupling to the transducer element 52 and to form the radially and outwardly-extending plugs 12' which partially fill and completely seal the windows 12. This is accomplished by sandwiching the core 7 between top and bottom discs 61, 62 and exerting a compressive force between the discs with the threaded end cap 13. The convex, radially and outwardly projecting plugs 12' become exposed through the windows 12 for contact with the surrounding fluid medium. There is thus established a smooth profile to the outside of casing 11, and at the same time neither mud nor water can penetrate into bore 14. The diameter of core 7 is such that even if the core material were cut or scratched through the windows 12, the operation of the crystals would not be adversely impaired. The hydrophone would still continue to convert acoustic energy, transmitted from the surrounding medium to the crystals through the solid core 7, into electric energy.

The core is installed inside the casing and becomes compressed in a longitudinal direction. This causes the elastomer to expand in a radial direction forcing the O-rings 7' to establish a better seal against the inner wall of bore 14. In the event that the seal provided by plugs 12' around one or more of the windows 12 should fail, then the top and bottom O-rings 7' will prevent moisture from passing beyond the O-rings, causing damage to the electrical connections. Crystals 50, 51 of hydrophone 19 and crystal 45 of accelerometer 15 can be made of the same piezoelectric material.

To obtain a cardioid directional seismic signal, the electrical components inside casing 11 must be interconnected, as shown in FIG. 6, with the polarities as indicated, whereby the hydrophone and the accelerometer are connected in series across terminals 24, 25 of the primary winding 20a of transformer 20.

Alternatively, a charge amplifier may be substituted for transformer 20. Charge amplifiers are known in the art as shown by U.S. Pat. No. 3,939,468.

In one application of the invention, the take out cables 30 of a plurality of composite detectors 10 are connected to a multi-wire cable. The composite detectors 10 are adapted to be jetted in mud, land, etc., in a generally-vertical direction. Should a detector 10 accidentally lie on its side, then the mass 36 will gravitationally uncouple from crystal 45, thereby effectively mechanically disabling accelerometer 15 without disrupting the electrical integrity between the output terminals 16, 17 of the accelerometer 15. When detector 10 lies on its side, only hydrophone 19 contributes an output signal to the primary winding 20a of transformer 20.

Other internal connections are possible as will be apparent to those skilled in the art. Obviously, either the hydrophone or the accelerometer or both can be directly connected to output wires 28, 29 without the use of a transformer.

In FIGs. 9-17 is shown a modified embodiment of the composite sensor, generally designated as 10'. It comprises a cylindrical body 60 having a cutout 59. Body 60 defines end cavities 60a, 60b and a center cavity 60c. In cavities 60a, 60b are mounted a pair of accelerometers 15a and 15b, respectively, and in cavity 60c is mounted a hydrophone 19. The support body 60 has a pair of axially and outwardly extending shafts 60d and 60e which are rotatably mounted in bearings 60f and 60g, respectively. Through the center of shaft 60e is connected a conductor 60'e and through the center of shaft 60d is connected a conductor 60'd. A pair of conductor blades 69, 69' have their ends secured to a pair of annular bushings 63, 63' by a pair of screws 63a and 63b, which also serve as electric output terminals for wires 61, 61'. The free ends of blades 69, 69' are provided with contacts 69a, 69'a which matingly engage with a pair of contacts 69a'and 69'a'. As can best be seen from FIG. 10, accelerometers 15a and 15b are connected in series with hydrophone 19 between the output terminals 63a and 63b.

It will be appreciated that the support 60 is gimble mounted so that the accelerometers will always be maintained in a vertical position when the composite sensor 10' is in a generallyhorizontal direction. Annular end bushings 63, 63' define a plurality of angularly-spaced and axially-aligned openings 64 through which extend stress cables 65 and conductor cables 65' in alternate openings 64.

In use, the composite sensors 10' are positioned at desired intervals within a seismic streamer cable 66 (FIGS. 11, 12) filled with a streamer liquid which penetrates inside the cavity 60c through the openings 67 in an external shield 68 (FIGS. 7-10). The streamer cable 66 is towed by a seismic vessel 70 in a body of water 71 above the sea bottom 72. Mounted over the streamer cable are a plurality of spaced-apart conventional depth controllers 73 adapted to maintain the streamer cable at a predetermined depth above the sea-bottom 72.

Figure 15:
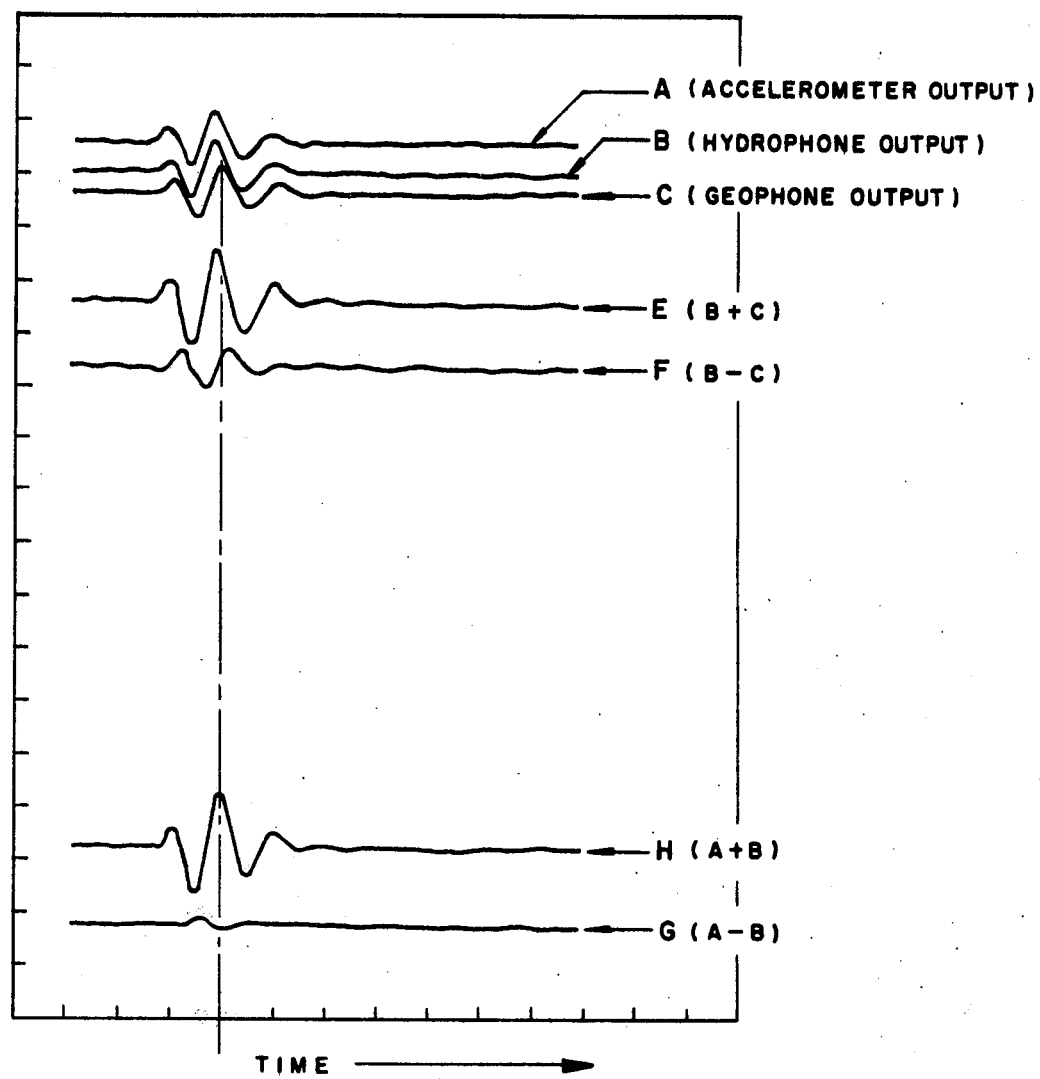
FIG. 15 shows waveforms useful for an understanding of the operation of the composite sensor of this invention.
Figure 8:
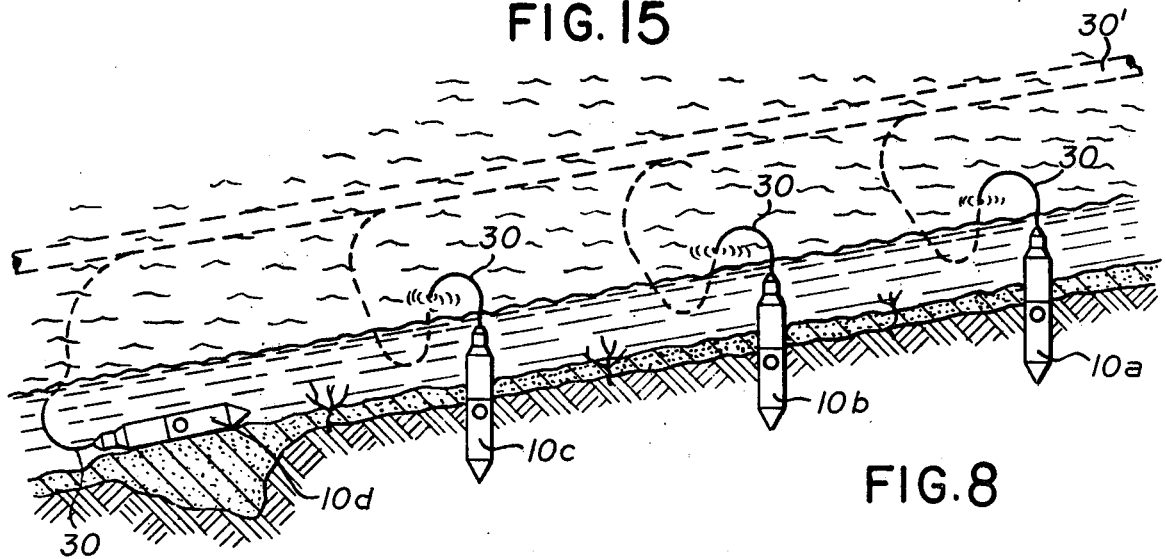
FIG. 8 is a schematic view somewhat diagrammatic of a seismic spread cable from which are suspended a plurality of spaced-apart, composite sensors.
Figure 10:
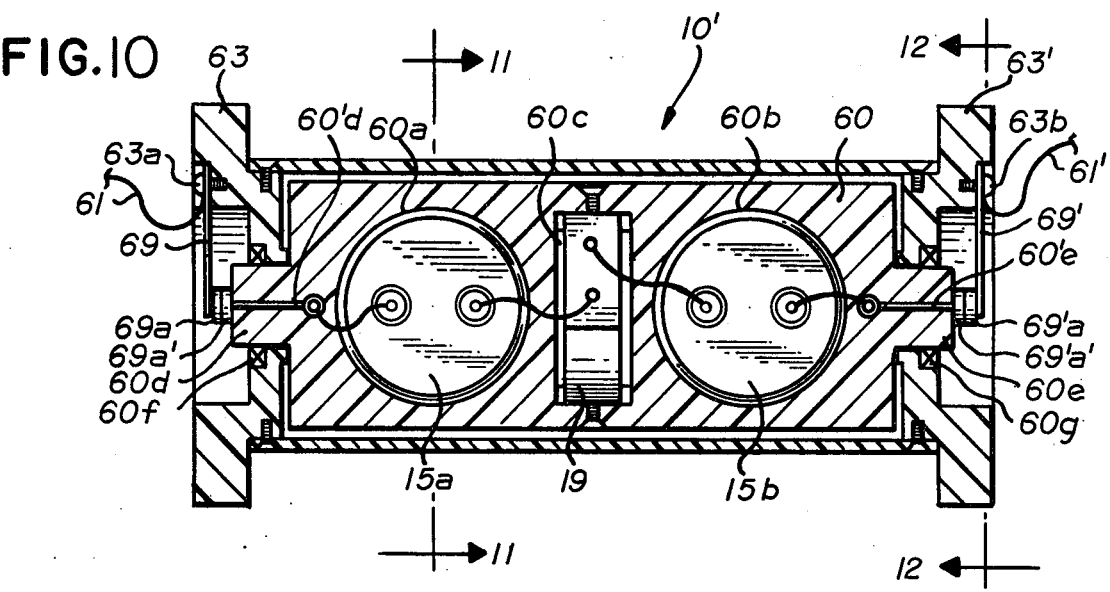
FIG. 10 is a view partly in section on line 10—10 in FIG. 9.
Figure 9:
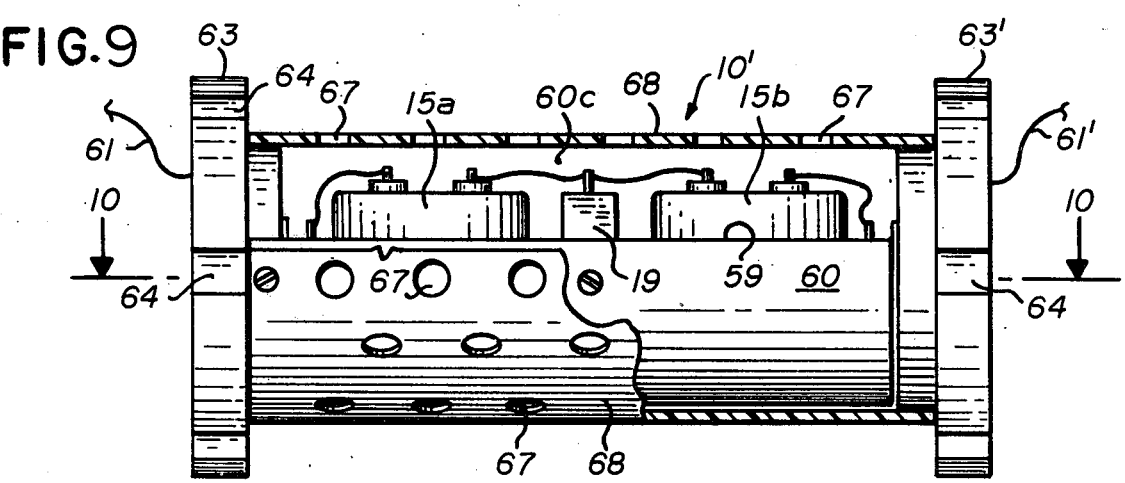
FIG. 9 is a front view, partly in section, of a gimblemounted composite sensor adapted for use within a seismic streamer cable.
Figure 11:
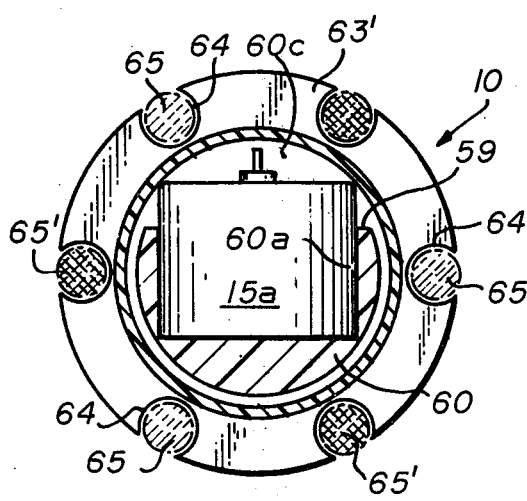
FIG. 11 and 12 are views partly in section on lines 11 and 12, respectively, in FIG. 10.
Figure 12:
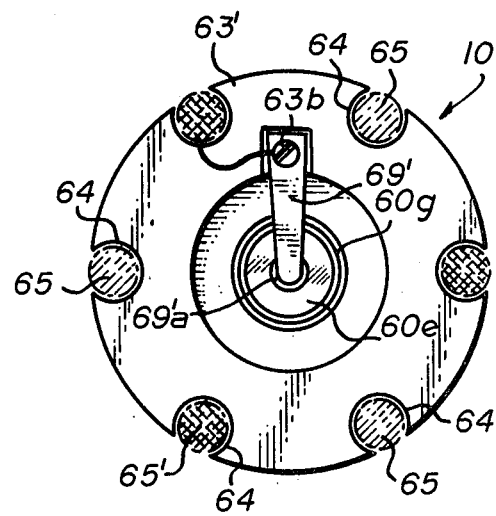
Figure 13:
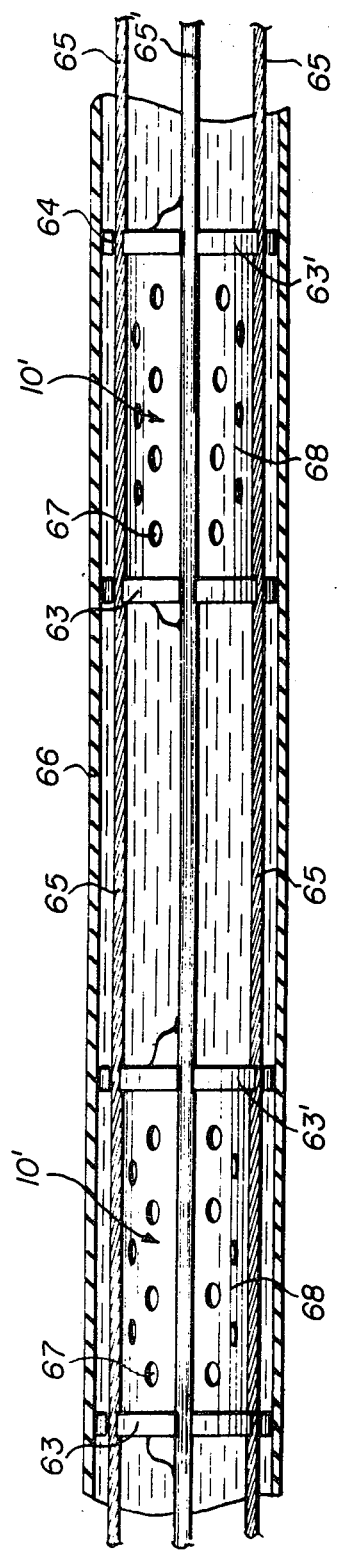
FIG. 13 is a schematic view somewhat diagrammatic of the gimble-mounted composite detectors within a streamer cable.
Figure 14:
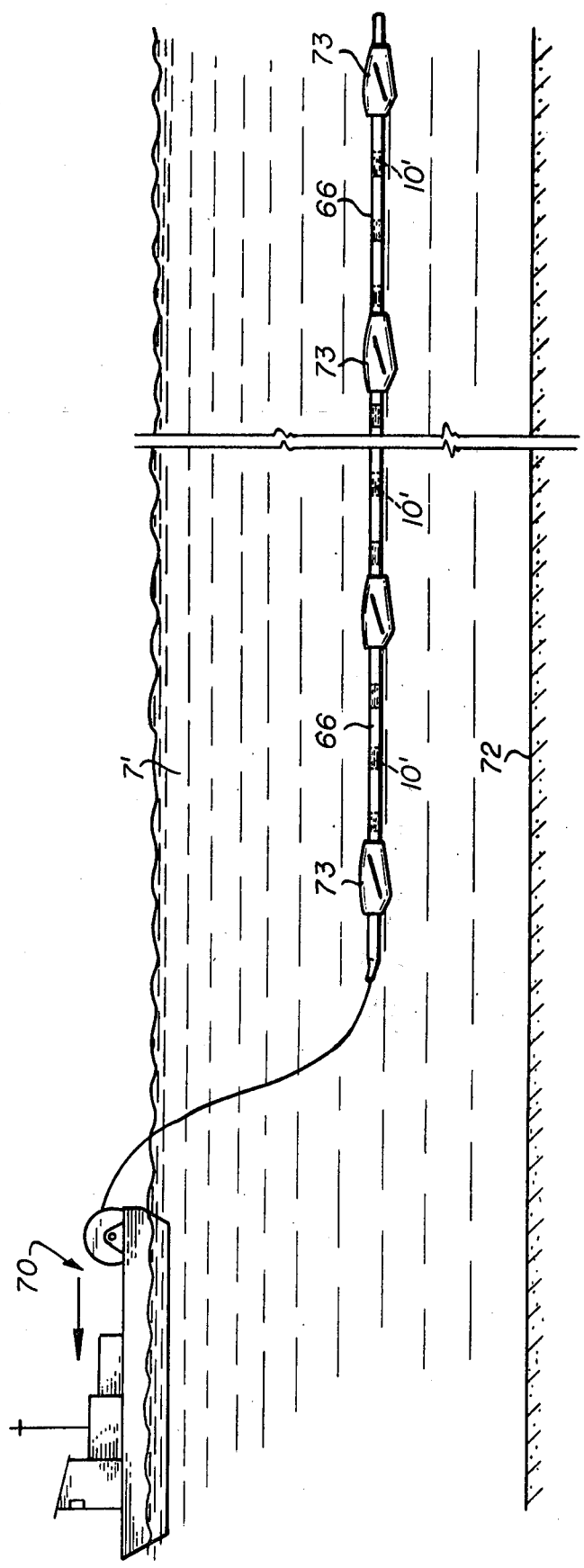
FIG. 14 shows a seismic boat towing the streamer cable of FIG. 13.

For an understanding of the operation of the composite sensor of this invention, reference is now had to FIG. 15 wherein are depicted typical detector output signals. Waveform A shows a typical output signal from an accelerometer 15 and waveform B shows a typical output signal from a hydrophone 19. Although the composite sensors of this invention do not employ a geophone it will be helpful for an understanding of this invention to also show a typical output signal C from a conventional geophone.

Figure 7:
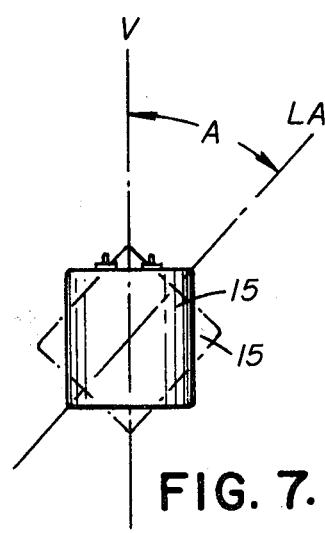
FIG. 7 shows the accelerometer inclined relative to the vertical.

As previously mentioned in the background section of this specification, U.S. Pat. Nos. 2,740,945, 2,846,662 and 3,332,057 show composite sensors consisting of a geophone coupled to a hydrophone. These patents assumed that the output signal C from the geophone and the output signal B from the hydrophone were in phase, whereas, in fact, I have discovered that they are substantially 90° out of phase. Since signals B and C are out of phase, their amplitudes can neither be algebraically added nor subtracted. Accordingly, such additions and subtractions as are illustrated in FIG. 7 of U.S. Pat. No. 2,740,945 are believed to be in error, a fact which would tend to explain why the prior art composite sensors of the foregoing type have not enjoyed commercial success.

If waveforms B and C were in phase and if their amplitudes were equal, then waveform $F=(B-C)$ would be a straight horizontal line, and waveform $E=(B+C)$ would have a peak amplitude equal to the sum of the peaks of signals B and C. As shown, neither F is a straight line, nor E has a peak equal to the sum of the peaks of B and C.

Since the composite sensor of this invention employs a hydrophone (signal B) in combination with an accelerometer (signal A), their individual output signals are substantially in phase, and, therefore, the peak of signal $H=(A+B)$ is the sum of the peaks of signals A and B, and the peak of signal $G=(A-B)$ is the difference between the peaks of signals A and B. If $[A]=[B]$, signal G will be a substantially straight horizontal line, as desired.

While the invention has been mostly described in connection with a composite sensor, the method of this invention can be practiced with the accelerometer and hydrophone being physically separated from each other, as will be apparent to those skilled in the art.

What is claimed is:

1. A seismic sensor comprising in combination:
    a rigid housing;
    a pressure sensor, encased in a module that is removably mounted in the housing, for generating a first signal proportional to pressure applied to the sensor;
    a separate acceleration sensor, encased in a module that is removably mounted beneath said pressure sensor module in the housing, for generating a second signal proportional to acceleration forces applied to the housing; and
    means for electrically connecting said pressure sensor in series directly with said accelerometer sensor to produce a third sum signal.

2. The sensor of claim 1 wherein the acceleration sensor module includes:
    a chamber having a longitudinal axis;
    an inertial mass in said chamber, mounted for free fall sliding motion along said longitudinal axis;
    compliant means encircling said inertial mass for guiding the free fall motion of said inertial mass; and
    a piezo-electric crystal operating in the bender mode supported by a circular substrate for generating the second signal, said crystal being gravitationally couplable to said inertial mass, becoming decoupled therefrom when the accelerometer sensor module is lying on its side.

3. The seismic sensor of claim 2 wherein said first and second signals are summed without integrating said second signal.

* * * * *